United States Patent [19]
Lucas

[11] 3,735,134
[45] May 22, 1973

[54] THERMOLUMINESCENT RADIATION DETECTOR

[75] Inventor: Arthur C. Lucas, Goleta, Calif.

[73] Assignee: VLN Corporation, Cleveland, Ohio

[22] Filed: Apr. 10, 1970

[21] Appl. No.: 28,168

Related U.S. Application Data

[63] Continuation of Ser. No. 688,615, Dec. 6, 1967, abandoned.

[52] U.S. Cl.............................250/71 R, 250/83 CD
[51] Int. Cl.................................................G01t 1/11
[58] Field of Search...............250/71, 83 CD, 83.3 R, 250/71.5; 252/301.4

[56] References Cited

UNITED STATES PATENTS

| | | |
|---|---|---|
| 3,141,973 | 7/1964 | Heins et al..........................250/71 R |
| 3,567,922 | 3/1971 | Blair...................................250/71 R |
| 3,555,277 | 1/1971 | Attix...................................250/71 R |

*Primary Examiner*—Archie R. Borchelt
*Attorney*—Ralph L. Cadwallader and Cadwallader & Kelly

[57] ABSTRACT

Radiation detector having hot-pressed thermoluminescent material disposed in close proximity to a heater element, both supported by electrical connecting pins passing through a base of a glass envelope enclosing the same in a gaseous environment of high thermal conductivity or of an open glass cylinder leaving the same exposed in an air environment. Combination may be heater wire threaded through cylinder of hot-pressed thermoluminescent material or flat planar heater and planar chip of hot-pressed thermoluminescent material.

2 Claims, 9 Drawing Figures

PATENTED MAY 22 1973

3,735,134

ARTHUR C. LUCAS
INVENTOR.

BY Ralph C. Cadwallader
Cadwallader And Kelly
ATTORNEYS

THERMOLUMINESCENT RADIATION DETECTOR

This application is continuation of Ser. No. 688,615, filed Dec. 6, 1967, and now abandoned.

BACKGROUND

The present invention relates to apparatus for measuring ionizing radiation, and more particularly, to an improved thermoluminescent radiation detector.

Exposure to ionizing radiation, such as X-rays, gamma rays, cosmic rays, and nuclear radiation generally, constitutes a serious hazard to human beings. Moreover, activities involving exposure to ionizing radiation are increasing. Thus, medical and dental practitioners expose their patients and themselves to X-rays and gamma ray radiation while performing a variety of diagnostic and therapeutic procedures. Nuclear fission atomic power plants, both stationary and mobile, produce biologically harmful radiations during operation. Moreover, their by-products are intensely radioactive materials which must be handled, processed, stored and transported. Concentrated radioactive isotopes find increasing uses in industry and in research laboratories. Military nuclear weapons, upon detonation, disperse immense quantities of radioactive material into the atmosphere which may fall on populated centers. In space exploration, manned vehicles pass through regions of intense ionizing radiation which expose the vehicles and their occupants to cosmic radiation generally. Thus, many people are being exposed to biologically harmful radiation. To avoid excessive dosage, such persons must monitor the total radiation which their bodies receive. In addition, there are numerous other requirements in industry and in research laboratories for monitoring radiation with high reliability. To do this, a variety of instruments, such as ionizing chambers, Geiger counters, scintillation detectors, and others, are used. These require power to operate, and have other disadvantages insofar as personnel radiation monitoring is concerned. Heretofore, passive or non-powered dosimeters, which integrate or sum the total incident radiation, have proven most useful for personnel monitoring. Most widely used are the small pocket-sized electroscope and the photographic film badge.

The photographic film badge dosimeter requires considerable processing after exposure to develop the film and to translate the developed film into units of radiation dosage. Then it is reloaded with fresh unexposed film before it is used again. Photographic film badge dosimeters are reliable through the dosage range in which they are sensitive; however, they lack as wide a dosage range as is desirable. Also, they lack close tolerance and quantitative reproducibility. Further, processing for readout is too complicated to be practical in field or disaster environments. Thus, there are many good reasons for replacing the photographic film badge dosimeter.

Another pocket-sized, easily read dosimeter utilizes the electroscope. These are easy to charge and to calibrate under field conditions and are conveniently read visually. However, they are highly sensitive to mechanical shock and rough handling, both of which causes loss of calibration. Therefore, their reliability is always questionable. They do have the advantage of not requiring complex processes for readout and reloading prior to reuse, but may be read out visually and recalibrated by very simple means.

Thus, the need exists for a highly reliable radiation dosimeter which may be used over and over again without additional reloading, complex processing, or calibration. Such a dosimeter must have a very high reliability and good accuracy under the most severe of field conditions or disaster environments. This need has led to serious and expensive efforts to adapt the phenomenon of thermoluminescence to personnel radiation dosimetry.

Thermoluminescence is a phenomenon observed in a number of materials, some of which occur naturally, in which electrons are sufficiently excited by impinging ionizing radiation to undergo transitions to certain metastable states or traps. From there they may be excited by heat energy to undergo further transitions to emitting states from which they experience optical transitions back to the ground state, emitting visible light during these latter transitions.

Thermoluminescent materials can now be prepared which exhibit good reproducibility in their response to radiation dosage. Further, they may be exposed repeatedly, even hundreds of times, to radiation, each radiation exposure being quantitatively impressed upon the material and they may be quantitatively read out upon heating between each exposure. Despite extensive reuse, the response of such samples of thermoluminescent materials to ionizing radiation remains unchanged.

To determine the amount of exposure, the thermoluminescent material is heated up to about 300°C during which it luminesces. The recording of luminescent brightness versus temperature taken at a constant heating rate is called the "glow curve". The number of different types of traps in the material and the energy by which the electrons are bound in these traps determine the number of peaks in the "glow curve" and the temperature at such peaks. With shallow traps (less binding energy) moderate ambient temperatures release the trapped electrons and visible photons. The deeper the trap, the higher is the glow peak temperature, and the more stable is the thermoluminescent signal of the phosphor at ambient temperatures. The thermoluminescent brightness for a given exposure depends on the concentration of trapping sites (quantum efficiency) and on the efficiency of the transitions back to the ground state. The rate of heating the phosphor also affects the glow curve, although the total light emitted is the same regardless of heating rate. Faster heating gives narrower glow curves of higher peak brightness and shifts the peak emission to higher temperatures.

When used in a personnel dosimeter the thermoluminescent detector is enclosed in a radiation shield to achieve uniformity of response to ionizing radiations of various energies. During readout light sensitive apparatus detects the luminescent output of the thermoluminescent material during the heating process, converts it to an electrical signal and recording apparatus records the entire glow curve, including the peaks. Either the area under the glow curve or a portion thereof, or the brightness of emitted light at the maximum glow peak constitutes a measure of ionizing radiation dosage. The application of heat during the readout process restores the thermoluminescent material to its original unirradiated condition releasing all the trapped electrons. Upon cooling, it is again in condition to register new ionizing radiation exposures. Thermoluminescent materials adaptable to dosimetry must have deep electron traps from which electrons and visible photons are not emitted at normal ambient temperatures. Any material having an appreciable number of shallow and intermediate depth traps, which are depopulated at ambient and moderately elevated temperatures with the passage of time, precludes its use for dosimetry.

Earlier endeavors to construct practical personnel radiation dosimeters with thermoluminescent phosphor materials were not successful because their detectors were insensitive to low dosage rates, or were unstable and released trapped electrons spontaneously at ambient temperatures with the passage of time. Continued efforts to develop thermoluminescent materials suitable for dosimetry resulted in the production of manganese-activated calcium fluoride, which contains deep traps almost exclusively. One serious disadvantage of the manganese-activated calcium fluoride is its undesirable chemical activity during processing. Other deep-trap thermoluminescent materials occur in nature in limited quantities and can be manufactured. These include lithium fluoride, calcium sulphate, and some organic materials.

Various schemes have been devised and proposed for the use of thermoluminescent materials in practical personnel dosimeters. One early device utilized only the glow peaks of "thresholds" of various thermoluminescent materials confined within a glass container. No effort was made to read the total radiation quantitatively, but the radiation dosage was estimated to be between that minimum dosage that would produce luminescence in the highest "threshold" material that luminesced and below that of the next higher threshold material that did not luminesce. Obviously, this device was not a practical dosimeter because it could not accurately measure radiation dosage.

A later endeavor included dosimeters prepared by mixing thermoluminescent powder with temperature resistant transparent cementing materials such as a mixture containing potassium silicate and then coating the mixture onto heating elements enclosed within a glass tube in an inert gaseous environment of low thermal conductivity. Dosimeters constructed in this manner give reliable readings for dosages as low as 50 mr. with little or no spurious luminescent effects. One difficulty encountered with this latter technique of mounting the phosphor is that repeated heating to temperatures in excess of 300°C during readout caused scaling and breaking up of the thermoluminescent coatings. Another difficulty is that potassium silicate in cementing mixtures is naturally radioactive and that dosimeters containing the same naturally accumulate dosage at the rate of about 0.4 milliroentgen per day. This is objectionable in some applications.

Another scheme contemplates compressing thermoluminescent phosphor powder consisting of a mixture of relatively large and small granular sizes, within a container having a transparent wall. Only sufficient compression is utilized to avoid relative motion of the powder granules with respect to each other and with respect to the container walls. This is done to avoid spurious thermoluminescence of various kinds.

However, these schemes do not provide an inexpensive, practical, sensitive, mechanically rugged dosimeter.

Deep-trap thermoluminescent materials, sensitive to radiation in the milliroentgen range, may be prepared in the laboratory. These materials have a further advantage of being linear in their response to radiation through as much as seven decades of radiation dosage. The desirability of adapting thermoluminescent materials to personnel radiation dosimeters is clear. There remains the practical problem of providing a thermoluminescent radiation detector which is sensitive to very small radiation dosage, which may be used over and over after repeated readout, and which will be inexpensive to manufacture.

The present invention involves a unique thermoluminescent radiation detector utilizing hot-pressed thermoluminescent materials made according to the process described in application Ser. No. 432,804 filed Feb. 15, 1965 which issued on Mar. 2, 1971 as U.S. Pat. No. 3,567,922 by Gerald E. Blair and assigned to the same assignee as the present invention.

OBJECTS

Accordingly, one object of this invention is to provide an improved thermoluminescent radiation detector.

Another object of this invention is to provide an inexpensive, sensitive, and reliable thermoluminescent radiation detector which may be accurately reproduced in great quantity.

Another object of the present invention is to eliminate any binders that may contain naturally radioactive materials, thus preventing natural accumulation of dosage.

In one type of prior art thermoluminescent radiation detector the manufacturing rejection rate averaged about 30 percent in order to produce detectors having an acceptable sensitivity of ± 10 percent. Thus, still another object is to provide a thermoluminescent radiation detector in which the manufacturing rejection rate is greatly reduced and the sensitivity is held to within ± 5 percent of the mean sensitivity.

Still another object is to provide thermoluminescent radiation detectors having precision in reading that is less than 1%.

A further object is to produce a thermoluminescent radiation detector capable of withstanding in excess of 20,000 heat cycles without degradation of operation.

Still a further object is to provide a thermoluminescent radiation detector that can be used to detect alpha particles and low energy beta and X-rays.

In prior art thermoluminescent radiation detectors the thermoluminescent material was enclosed in an inert environment of low thermal conductivity or in an evacuated chamber. It was believed that this completely suppressed spurious luminescence thus providing a threshold of practical detection of radiation dose in the low milliroentgen range. In particular, it was believed that the constituents of air—oxygen, nitrogen and carbon dioxide—gave rise to spurious luminescence, thus preventing reliable detection of radiation doses in the milliroentgen range. I have discovered that this is not necessarily so. Consequently, it is still another object of the present invention to provide a thermoluminescent radiation detector of superior operating characteristics in which the thermoluminescent material is enclosed in air.

Other objects and various further features of novelty and invention will be pointed out or will occur to those

DESCRIPTION OF THE DRAWINGS

The invention is more easily described by referring to the following illustrations in which.

DETAILED DESCRIPTION

In U.S. Pat. No. 3,282,855 issued Nov. 1, 1966 to R. C. Palmer et al for "Method of Making Thermoluminescent Manganese-Activated Calcium Fluoride" and assigned to the assignee of the present invention, the patentees disclose a method of making manganese-activated calcium fluoride. The method comprises mixing an aqueous slurry of calcium carbonate and 1 to 10 mole percent of manganous carbonate with a concentrated solution of hydrofluoric acid. The reaction is quite vigorous and after 2 or 3 minutes a coprecipitate of calcium fluoride and manganous fluoride forms. When the coprecipitate ceases forming, it is washed 3 or 4 times with either deionized or distilled water to remove all hydrofluoric acid and by-products of the reaction. It is then dried at about 95°C, producing a powdered mixture of calcium fluoride and manganous fluoride. At this stage the coprecipitate is not useful as a thermoluminescent material because it is only slightly thermoluminescent. The powdered coprecipitate is then placed in a platinum crucible and heated in a dry inert atmosphere for 30 minutes at a temperature of about 1200°C. During this heating the coprecipitate becomes a cake of manganese-activated calcium fluoride which is highly thermoluminescent. After cooling, the cake may be broken up and pulverized into a powder for use in manufacturing thermoluminescent dosimeters. The latter step of heating at 1200°C is called "activating" because it is believed that such heating forces many more manganese ions into the crystal lattice of the calcium cluoride creating many more deep traps thereby making the material highly thermoluminescent. The above identified application discloses that the 1200°C heating step and the additional detector manufacturing steps of coating some substance with manganese-activated calcium fluoride may be omitted and that hot-pressing techniques may be utilized to concurrently activate and form the coprecipitated calcium fluoride and manganous fluoride into a solid, activated thermoluminescent material.

First Embodiment

Figure 1:
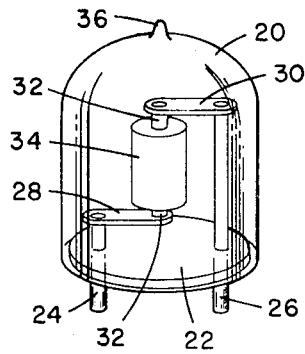
FIG. 1 is a perspective view of an embodiment of the present invention that appears to be preferred in the market place.
Figure 2A:
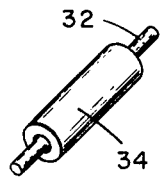
FIGS. 2A and 3 are perspective views of parts of the thermoluminescent detector of FIG. 1.

Referring to FIG. 1, one embodiment of the present invention comprises transparent glass envelope 20 that may be sealed to glass base 22 by known techniques. Connecting pins 24 and 26 pass through base 22 and are sealed therto. Cantilever arms 28 and 30 are connected to pins 24 and 26 and to heater wire 32 by known techniques such as by welding. Encompassing heater wire 32 is a cylinder 34 of a hot-pressed thermoluminescent material such as, for example, manganese-activated calcium fluoride or lithium fluoride. This is illustrated in greater detail in FIG. 2A. After assembly, glass envelope 20 is sealed at tip 36.

Figure 3:
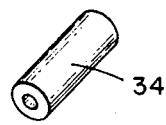
Figure 4:
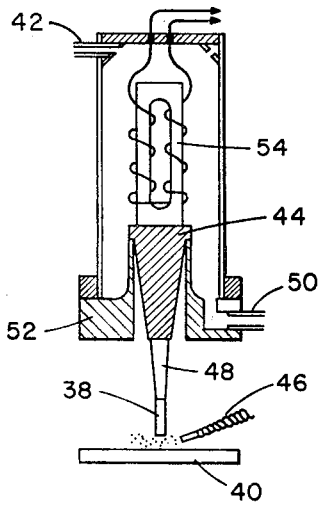
FIG. 4 is a partial sectional view of a simple ultrasonic drill press utilized to make the part illustrated in FIG. 3.
Figure 5:
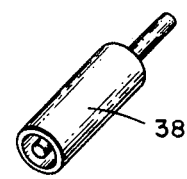
FIG. 5 illustrates a special cutter utilized in the drill press of FIG. 4 to make the part of FIG. 3.

Cylinder 34 may be cut from a piece 40 of hot-pressed thermoluminescent material using a conventional ultrasonic drill press such as illustrated in FIG. 4 using the steel cutter 38 illustrated in FIG. 5. Those familiar with ultrasonic drill presses will recognize water inlet 42, permanent conical shank 44, working piece 40 of hot-pressed thermoluminescent material, abrasive feed line 46, steel cutter 38, removable conical rod 48, water outlet 50, support 52, and mangnetostrictive vibrator 54 of the ultrasonic drill press illustrated in FIG. 4. Moreover, they will recognize that steel cutter 38 of FIG. 5 may be used to cut cylinder 34 of FIG. 3. A suitable abrasive is aluminum oxide having a 200 mesh grain size.

Example 1

One example of the embodiment of FIG. 1, in no way to be construed as limiting, contained a cylinder 34 of hot-pressed manganese-activated calcium fluoride having an outside diameter of 0.080 inch, an inner diameter of 0.0165 inch and a length of 0.26 inch. Nichrome heater wire 32 had a diameter of 0.016 inch and was slightly longer than cylinder 34. Cantilever arms 28 and 30 and connecting pins 24 and 26 were made of Kovar, an alloy of nickel, cobalt and iron used extensively for metal-to-glass seals. Connecting pins 24 and 26 extend below base 22 a sufficient distance, are spaced from each other such a distance and are of such a diameter that the detector of FIG. 1 may be inserted into a standard transistor socket. Glass envelope 20 had an outside diameter of 0.43 inch and a length of 1 inch, and was sealed at tip 36 to enclose the assembly in air at atmospheric pressure.

Test Results

The thermoluminescent radiation detector of the above example has been extensively tested with very gratifying results. Since cylinder 34 can be made quite accurately, the sensitivities of these detectors all fall within ± 5 percent of the mean sensitivity with no manufacturing rejections. Moreover, precision of reading is less than 1% of standard deviation and appears to be close to ½%. Further, such detectors have undergone in excess of 30,000 heat cycles without degradation in performance. This detector does suffer serious degradation in performance if exposed to huge radiation dosage. For example, when exposed to $10^8$ roentgen and thereafter used to measure dosages in the range of 100 to 500 milliroentgens the readings were off by 30 percent. However, this means that for normal dosages, the detector can be used more than one thousand times without suffering measurement degradation.

The detector of the above example was designed to be heat cycled in 15 seconds and to reach its glow peak in 10 seconds when a current of 6.5 amperes is passed through heater wire 32.

The Example that no binders, such as potassium silicate, are used ensures that the detectors of the present invention will not accumulate dosage from naturally radioactive material.

EXAMPLE 2

In another example utilizing parts having the same dimensions as in Example 1, envelope 20 was sealed at tip 36 to enclose the assembly in helium at atmospheric pressure. The detectors of Example 1 were then compared with those or Example 2. When a non-radiated Example 1 detector is heated so that its temperature increased at the rate of 30°C per second for 10 seconds, its overall incandesence, as measured by a thermoluminescent detector reader, was the equivalent of 1.5 milliroentgen. This incandescence is caused by poor thermal coupling between heater wire 32 and element 34 such that hot spots produced on heater wire 32 are visible through element 34. When the same test was made with a non-radiated Example 2 detector, its overall incandescence was the equivalent of 0.1 milliroentgen, indicating a significant improvement in thermal coupling between heater wire 32 and element 34 caused by the helium fill. Practically, this means that Example 2 detectors can be used to measure much smaller radiation dosages than Example 1 detectors.

Alternative

Figure 2B:
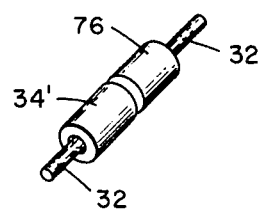
FIG. 2B is an alternative embodiment of the parts illustrated in FIG. 2A.

An alternative embodiment to that illustrated in FIG. 1 utilizes the combination of parts illustrated in FIG. 2B where heater wire 32 is inserted into two cylinders 34' and 76 of different hot-pressed thermoluminescent material, each about one-half the length of cylinder 34 of FIG. 1. Cylinder 34' may be hot-pressed manganese-activated calcium fluoride and cylinder 76 may be hot-pressed lithium fluoride. Upon reading such an irradiated detector there will be two glow curve peaks, one for the calcium and one for the lithium. If the calcium peak reads higher than the lithium peak the original incident radiation consisted of X-rays, having energies probably in the 100 to 200 Kev region. If the peaks read the same the incident radiation consisted of gamma rays.

Second Embodiment

Figure 6:
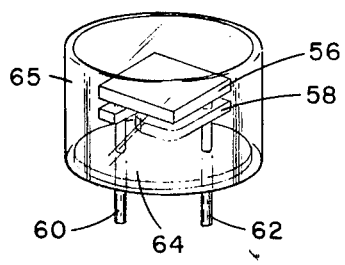
FIG. 6 is a perspective view of an alternative embodiment finding particular usefulness as a low energy thermoluminescent radiation detector.
Figure 7:
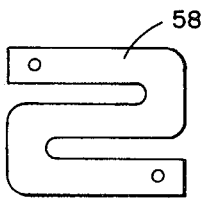
FIG. 7 is a plan view of the heater used in the embodiment of FIG. 6.

In another embodiment of the present invention a flat chip of hot-pressed thermoluminescent material is used. Such a chip may, for example, be 6 millimeters square by ½ millimeter thick and is represented by reference character 56 in FIG. 6. The embodiment of FIG. 6 is illustrative only and is not to be construed as limiting because a number of different configurations may be utilized incorporating such a flat chip of hot-pressed thermoluminescent material into a detector. Spaced from chip 56 a short distance is flat heater 58. Heater 58 may be nichrome and take the shape illustrated in FIG. 7. Both chip 56 and heater 58 are mounted on connecting pins 60 and 62 which pass through glass base 64. Glass cylinder 65 may, as in FIG. 1, be flame sealed to base 64. Again, connecting pins 60 and 62 may be arranged to fit into a standard transistor socket.

The embodiment of FIG. 6 is particularly exciting from the health-physics viewpoint because it has been found that this detector can be used to measure as low as one thousand alpha particles with an accuracy of ± 10 percent. This capability makes it competitive with counting methods. It is particularly useful in measuring alpha contamination in uranium mines. It also has great utility in measuring low energy beta radiation and low energy X-rays, such as those produced by plasmas. This detector is particularly easy for technicians to handle. It is, compared to other detectors, very precise and has a very high detectability for low energy particles.

Figure 8:
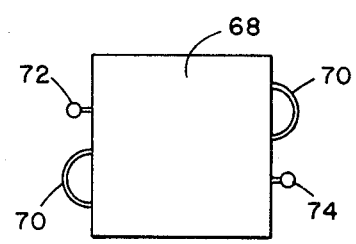
FIG. 8 is a plan view of an alternative configuration useful in the embodiment of FIG. 6.

It will be obvious that cylinder 65 may, for example, be replaced with a flat-topped glass envelope and that the same may be filled with either air or helium. Alternative FIG. 8 illustrates a different embodiment of the chip-heater combination of FIG. 6. Chip 68 is thicker than chip 56 of FIG. 6 and has three holes drilled through it, through which nichrome heater wire 70 is threaded. Points 72 and 74 of heater wire 70 may be welded to connecting pins 60 and 62 of FIG. 6 in this embodiment.

Summary

In the embodiments of the invention herein disclosed it has been found that no spurious luminescence occurs during measurement of an irradiated detector even though the thermoluminescent material is enclosed in an air environment. A helium environment increases thermal conductivity, thus greatly improving detectability. Moreover, it has been found when the environment of the detectors of the present invention is changed to a vacuum, such serious degradation in operating characteristics occurs that the detectors are useless. The use of flat chips of thermoluminescent material exposed to air finds great utility in measuring alpha radiation.

Further modifications will occur to those skilled in the art and all such are considered to fall within the spirit and scope of the invention as defined in the appended claims.

What is claimed is:

1. A thermoluminescent radiation detector having a transparent envelope enclosing:
    an environment of a gas selected from the group consisting of helium and air;
    an electrical heating element;
    electrical connecting means passing through the envelope for connecting the heating element to a source of electrical power; and
    a preformed cylindrically-shaped member made of hot-pressed thermoluminescent material selected from the group consisting of manganese-activated calcium fluoride and lithium fluoride, the member having a coaxial opening passing therethrough through which the electrical heating element is threaded.
    two preformed cylindrically-shaped, hot-pressed members made respectively of manganese-activated calcium fluoride and lithium fluoride, each of predetermined length having a coaxial opening passing therethrough, through which the electrical heating element is threaded, each member providing a separate glow curve peak to enable determination of the type of incident radiation that has struck the detector.

2. A thermoluminescent radiation detector having a transparent envelope enclosing:

an environment of a gas selected from the group consisting of helium and air;
an electrical heating element;
electrical connecting means passing through the envelope for connecting the heating element to a source of electrical power; and
two preformed cylindrically-shaped, hot-pressed members made respectively of manganese-activated calcium fluoride and lithium fluoride, each of predetermined length having a coaxial opening passing therethrough, through which the electrical heating element is threaded, each member providing a separate glow curve peak to enable determination of the type of incident radiation that has struck the detector.

* * * * *